(12) United States Patent
Andersson et al.

(10) Patent No.: US 6,931,016 B1
(45) Date of Patent: Aug. 16, 2005

(54) VIRTUAL PRIVATE NETWORK MANAGEMENT SYSTEM

(75) Inventors: Loa Andersson, Jlvsjo (SE); Marcel Wiget, Juan les Pins (FR); Tove Madsen, Trangsund (SE)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/417,864

(22) Filed: Oct. 13, 1999

(51) Int. Cl.[7] .............................................. H04L 12/28
(52) U.S. Cl. ..................................... 370/401; 370/260
(58) Field of Search .............................. 370/352, 260, 370/261, 262, 401; 709/203, 204, 205, 227

(56) References Cited

U.S. PATENT DOCUMENTS

| | | | | |
|---|---|---|---|---|
| 5,768,271 | A | * | 6/1998 | Seid et al. ................... 370/389 |
| 6,061,796 | A | * | 5/2000 | Chen et al. .................. 713/201 |
| 6,212,548 | B1 | * | 4/2001 | DeSimone et al. .......... 709/204 |
| 6,226,751 | B1 | * | 5/2001 | Arrow et al. ................ 713/201 |
| 6,438,127 | B1 | * | 8/2002 | Le Goff et al. ............. 370/389 |
| 6,442,590 | B1 | * | 8/2002 | Inala et al. .................. 709/204 |
| 6,484,196 | B1 | * | 11/2002 | Maurille ...................... 709/206 |

FOREIGN PATENT DOCUMENTS

| | | | |
|---|---|---|---|
| EP | 0 750 256 A2 | 12/1996 | ............. G06F/9/46 |
| EP | 0 750 256 A3 | 12/1996 | ............. G06F/9/46 |
| WO | WO 98/58356 | 12/1998 | ............. G07F/7/00 |

OTHER PUBLICATIONS

J. Oikarinen, Internet Relay Chat Protocol, May 1993, IETF, Network Group, Request for Comments: 1459.*

* cited by examiner

*Primary Examiner*—Chi Pham
*Assistant Examiner*—Keith M. George
(74) *Attorney, Agent, or Firm*—Steubing McGuinness & Manaras LLP (57) ABSTRACT

An apparatus and method of managing a virtual private network having a set of network devices maintains a network device memory set for storing a set of network device identifiers that identifies each of the set of network device. More particularly, a request to join the virtual private network is received from a given network device having a given network device identifier that identifies the given network device. The set of network device identifiers then is retrieved from the network device memory set to identify all network devices in the set of network devices. A notify message then is forwarded to each of the set of network devices, and a join message is forwarded to the given network device. The notify message includes the given network device identifier, while the join message includes the set of network device identifiers. The given network device identifier then is stored in the network device memory set.

54 Claims, 5 Drawing Sheets

VIRTUAL PRIVATE NETWORK MANAGEMENT SYSTEM

FIELD OF THE INVENTION

The invention generally relates networks and, more particularly, the invention relates to managing a virtual private network.

BACKGROUND OF THE INVENTION

Although deployed across third party networks, virtual private networks have the look and feel of a private network, such as an intranet utilized by a private company. In fact, many currently utilized virtual private networks are deployed across the Internet to provide a private network solution at a relatively low cost.

A virtual private network ("VPN") often includes two or more preconfigured network devices that each act as VPN nodes in their VPN. To that end, each such network device typically is preconfigured with the address of all other network devices to be in their VPN, and preselected network routes (hereinafter "tunnels") between each of the other network devices in their VPN. By way of example, a given VPN that utilizes the Internet may include a first router with its associated local area network, and a second router with its associated local area network. The first router is preconfigured to have the Internet Protocol address of the second router, and a set of preselected network tunnels to the second router. In a similar manner, the second router is preconfigured to have the Internet Protocol address of the first router, and a set of preselected network tunnels to the first router. Accordingly, the two routers and the members of their respective local area networks communicate in their VPN across the Internet via the preselected network tunnels.

Problems arise, however, when network devices (e.g., routers) that are not preconfigured are to be added to a VPN that operates in the above described manner. Specifically, such network devices cannot be added to a VPN unless they are configured with the above noted preconfiguration data.

SUMMARY OF THE INVENTION

In accordance with one aspect of the invention, an apparatus and method of managing a virtual private network having a set of network devices maintains a network device memory set for storing a set of network device identifiers that identifies each of the set of network devices. More particularly, a request to join the virtual private network is received from a given network device having a given network device identifier that identifies the given network device. The set of network device identifiers then is retrieved from the network device memory set to identify all network devices in the set of network devices. A notify message then is forwarded to each of the set of network devices, and a join message is forwarded to the given network device. The notify message includes the given network device identifier, while the join message includes the set of network device identifiers. The given network device identifier then is stored in the network device memory set.

In response to receipt of the notify message, at least one of the set of network devices preferably communicates with the given network device to establish a communication tunnel with the given network device. In a similar manner, in response to receipt of the join message, the given network device preferably communicates with at least one of the network devices in the set of network devices to establish a communication tunnel with the at least one of the set of network devices. Among other data, the request may include a network identifier identifying the given virtual private network. In alternative embodiments, the total number of network devices in the set of network devices may equal zero. In such case, the network device memory set may be a database that is established for the given virtual private network in response to receipt of the request.

In some embodiments, the apparatus and method authenticate the request to confirm the identity of the given network device. The request may be received from a packet based network, and the network identifier may be an Internet Protocol address. Moreover, among other data, the join message and notify message may include data identifying the given virtual private network. In some embodiments, the apparatus and method generate the notify and join messages.

A remove message may be received from a remove network device. Once received, all network device identifiers again may be retrieved from the network device memory set, and a first message may be forwarded to all network devices identified by the retrieved network device identifiers. Each first message may include a remove identifier identifying the remove network device. In addition, in response to receipt of the first message, at least one of the network devices in the set of network devices disconnects a communication tunnel between the at least one network device and the remove network device. A second message that includes the retrieved network device identifiers may be forwarded to the remove network device.

In accordance with another aspect of the invention, a method of managing a virtual private network (having a set of member network devices each identified by a device identifier) maintains a storage device with the device identifier of each member. The storage device is updated as network devices are added to and removed from the virtual private network. Accordingly, in response to receipt of a request to join the virtual private network (from a given network device having a given network device identifier and data identifying the virtual private network), a notify message and join message are generated. The notify message has the given network device identifier, while the join message has the device identifiers in the storage device. The notify message then is forwarded to each of the set of network devices, and the join message is forwarded to the given network device.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Figure 1:
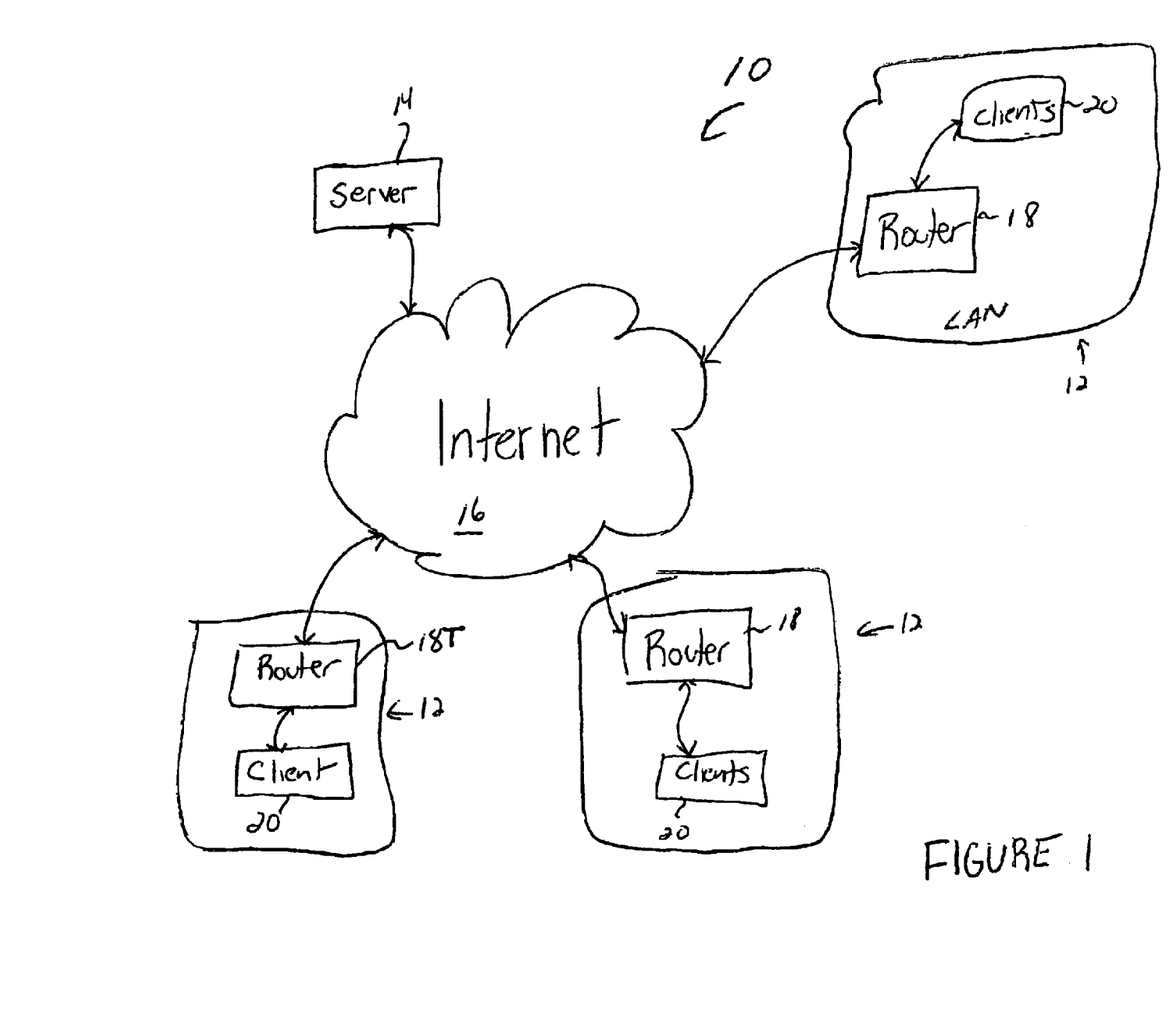
FIG. 1 schematically shows an exemplary network arrangement in which illustrative embodiments of the invention may be implemented.

FIG. 1 schematically shows an exemplary network arrangement that may be utilized to implement a virtual private network ("VPN") configured in accordance with illustrative embodiments of the invention. Specifically, the network 10 includes a plurality of local area networks 12 that each communicate with a VPN manager server ("manager server 14") via the Internet 16. The manager server 14 may be a single server, or a cluster of cooperating servers. In fact, the manager server 14 need not be a part of any VPN. For example, the manager server 14 may be utilized as a third party server that establishes, maintains, and terminates VPNs for any set of network devices (e.g., routers).

Each local area network 12 includes one or more conventional routers 18 and a plurality of coupled clients 20. The clients 20 each may be any type of well known network device, such as a personal computer or server. Of course, each router 18 includes the logic for cooperating with the other network devices (i.e., the other routers 18 and the manager server 14) to establish VPNs in accordance with illustrative embodiments of the invention.

In some embodiments, the routers 18 and manager server 14 cooperate to establish, maintain, and terminate VPNs in a manner that permits routers 18 and other network devices to join VPNs without having, in advance, special preconfigured tunnels and special preconfigured VPN membership lists. More particularly, as discussed in greater detail below, network devices joining a specified VPN are given a current list of members of the specified VPN upon joining. Accordingly, joining network devices are not required to have the identity of all such members preconfigured in their memory prior to joining. This permits membership in VPNs to be dynamically changed with relative ease. Moreover, the various tunnels utilized for transmitting data between the member network devices can be dynamically established by the existing member network devices and joining devices at the time that the joining network devices join the VPN. This enables the member network devices to establish optimal tunnels based upon current network conditions and thus, not based upon preconfigured tunnels that may be less efficient.

Figure 2:
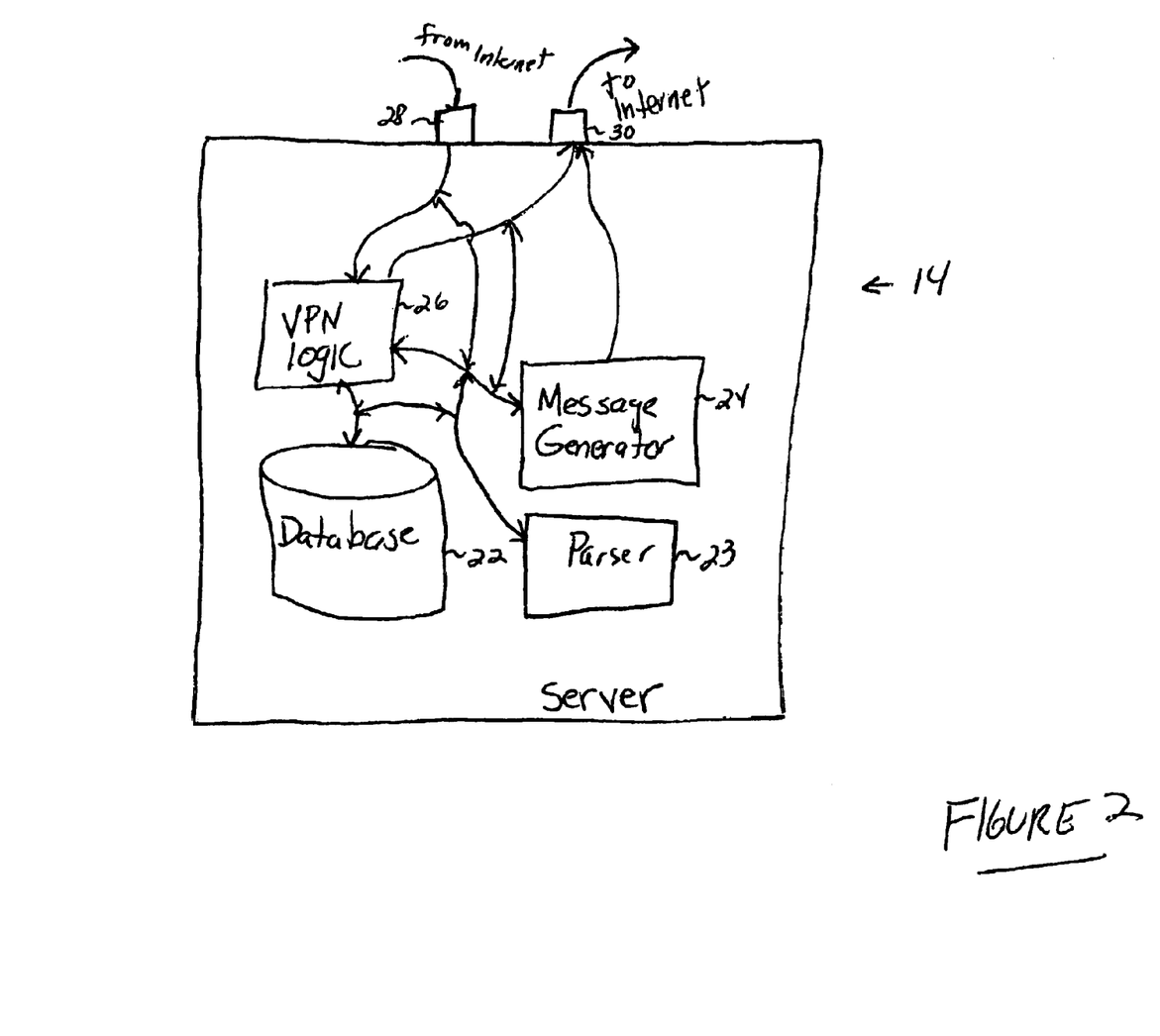
FIG. 2 schematically shows a manager server that manages virtual private networks in accordance with illustrative embodiments of the invention.

As shown in FIG. 2, the manager server 14 includes various modules for managing the membership of any VPN that may be established across the network in accord with illustrative embodiments of the invention. The manager server 14 may simultaneously manage any number of VPNs, such as one VPN, or hundreds of VPNs. To that end, the manager server 14 includes data storage 22 (e.g., a database) for storing information relating to one or more VPNs, a parser 23 for parsing data from received messages, a message generator 24 for generating messages identifying members of the various VPNs managed by the manager server 14, and VPN logic 26 for managing the various VPNs and retrieving data from the database. The manager server 14 also includes an input port 28 for receiving data from the Internet 16, and an output port 30 for forwarding data to the various routers 18 across the Internet 16. Details of the interaction of these manager server modules are discussed below with reference to FIGS. 4 and 5.

Figure 3:
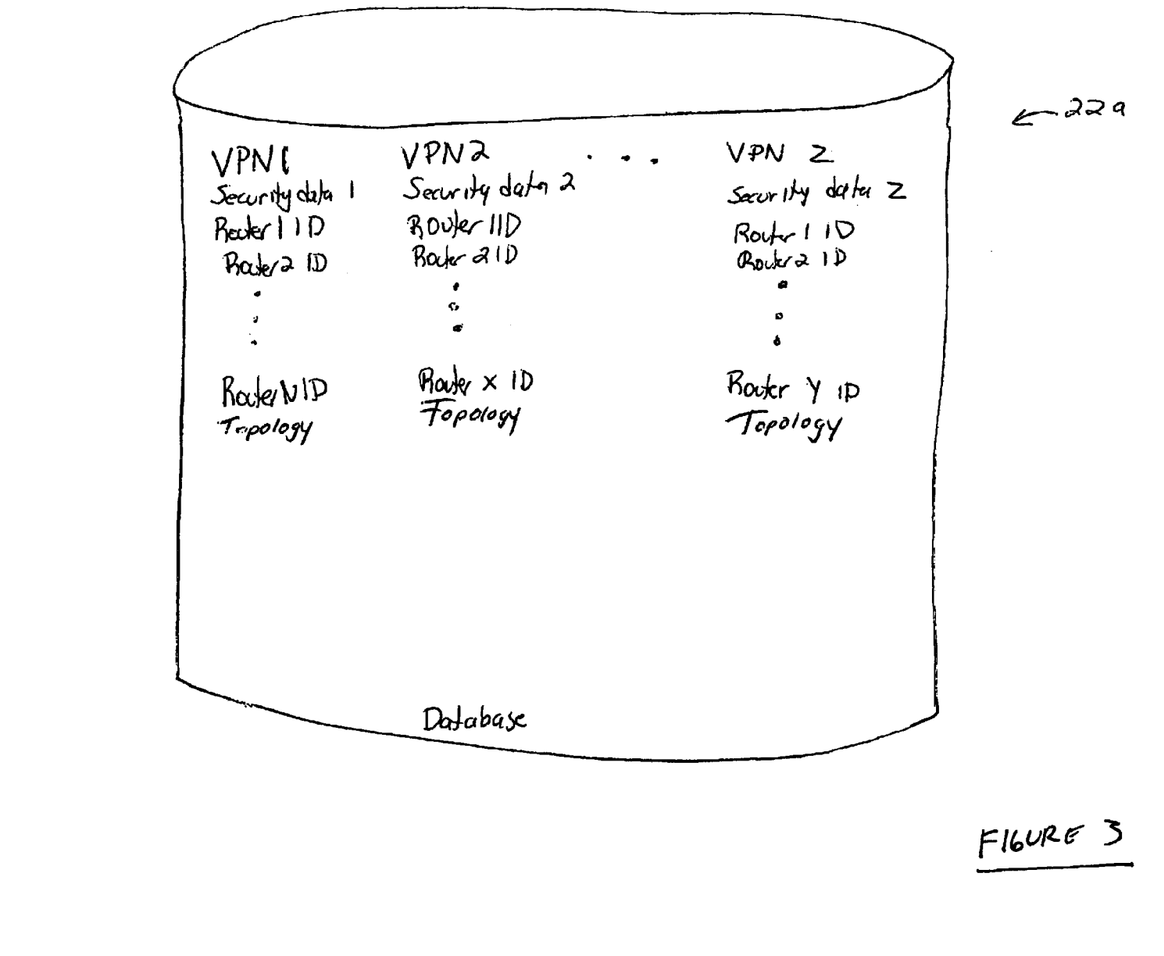
FIG. 3 schematically shows an illustrative database that may be in data storage for storing data relating to various VPNs.

FIG. 3 schematically shows a preferred VPN database ("database 22a") in the data storage 22. In particular, the database 22a includes a plurality of lists of data that each relate to one VPN. For example, the database 22a shown includes data relating to a total of Z VPNs that each are managed by the manager server 14. Each VPN has an associated VPN identification code, security data relating to the VPN, and a list of network devices (i.e., routes 18) that are members of the specified VPN. Among other things, the security data may include authentication data for authenticating routers 18 attempting to access the VPN, such as encryption keys an/or passwords.

Figure 4:
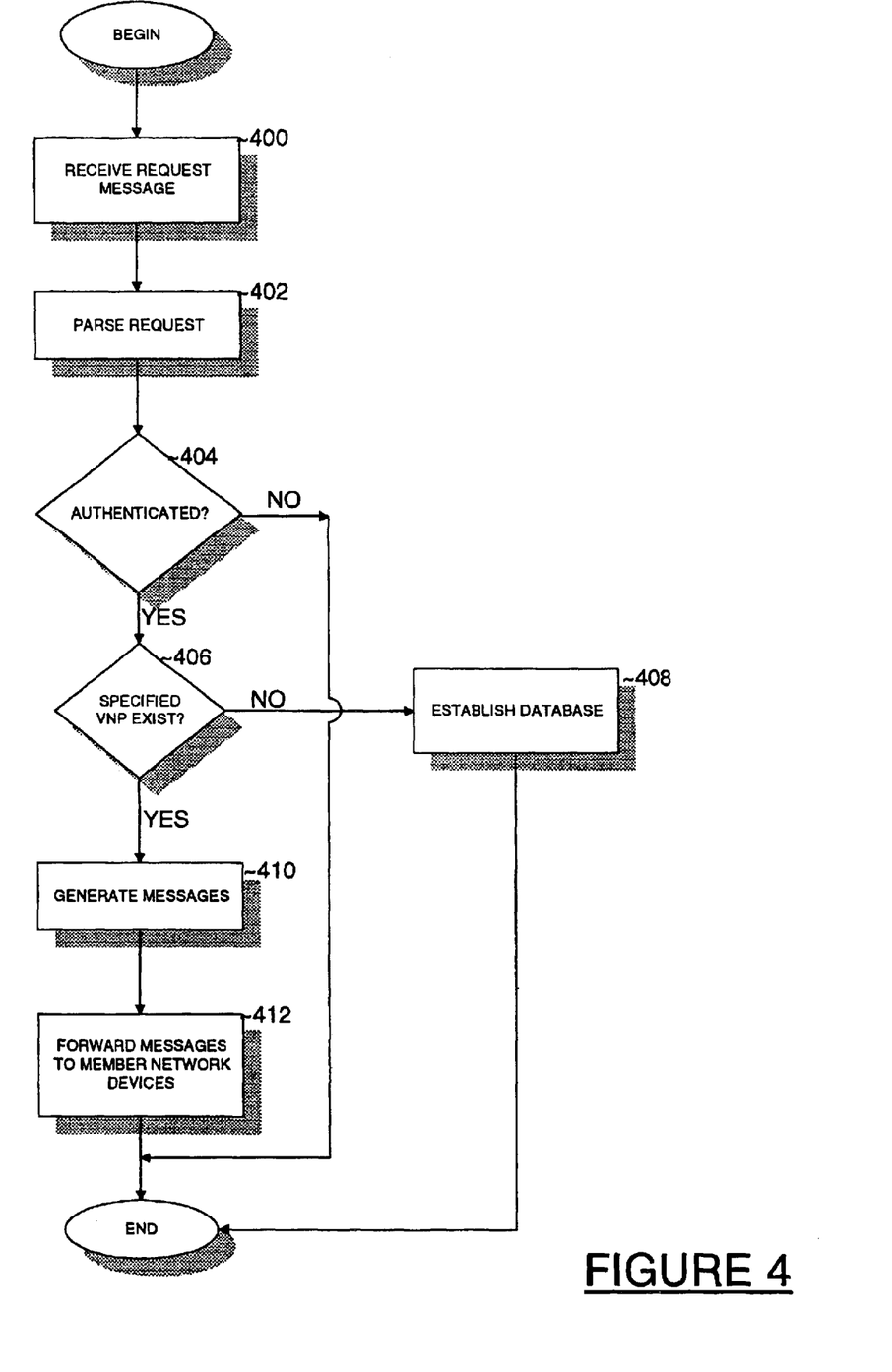
FIG. 4 shows an illustrative process of establishing and maintaining a VPN in accordance with illustrative embodiments of the invention.

FIG. 4 shows an illustrative process utilized by the manager server 14 for establishing and maintaining a VPN in accordance with illustrative embodiments of the invention. The process begins at step 400 in which a request message from a router 18 attempting to join a given VPN is received at the input port 28 of the manager server 14. The request includes the VPN identifier identifying the VPN the router 18 is attempting to join, and the Internet Protocol address of the router 18. In addition, the request also may include topology data, or authentication data (e.g., a password or an encryption key).

Upon receipt of the request, the VPN logic 26 parses the request to determine the VPN identifier, IP address, and the security data (step 402). The VPN logic 26 then determines, at step 404, if the router 18 is permitted to join the VPN to which membership is requested. To that end, the VPN logic 26 may access the database 22a to determine if the security data in the request matches the security data in the database 22a. For example, a password may be compared to determine if access to the VPN is permitted. As a further example, symmetrical and asymmetrical keys may be utilized with conventional encryption methods for authentication purposes. The process ends if the router 18 is not authenticated. In such case, the message generator 24 may generate and forward a denial message to the requesting router 18 indicating that such router 18 cannot join the requested VPN.

If the VPN logic 26 determines at step 404 that the router 18 is permitted to join a VPN, then the process continues to step 406 in which the VPN logic 26 determines if the VPN to which access is requested is currently executing (i.e., it is determined if such VPN exists). To that end, the VPN identifier in the request is compared to the VPN identifiers in the database 22a. If no such VPN is found in the database 22a, then the process continues to step 408 in which a new database 22a for the requested VPN is initialized. The new database 22a preferably is added to the existing database 22a as another VPN entry (i.e., another list in the database 22a). Alternatively, the new database 22a is separate from the existing database 22a. The new database 22a may be initialized to include the VPN identifier and Internet Protocol address (of the requesting router) parsed from the request. In addition, the new database 22a also may include security data parsed from the request. Accordingly, the security data parsed from the request is utilized to authenticate subsequent network devices attempting to access the noted VPN.

In alternative embodiments, the manager server 14 cannot initiate VPNs that do not have an existing entry in the database 22a. In such case, if there is no match, the manager server 14 may generate and forward a rejection message to the requesting router 18. The rejection message acknowledges receipt of the join request, but indicates that the request to join the VPN was rejected.

Returning to step 406, if it is determined that the request VPN does in fact exist and has at least one member router 18, then the process continues to step 410 in which various messages are generated for the member routers 18 and the joining router 18. More particularly, the VPN logic 26 provides the message generator 24 with the Internet Protocol address of the joining router 18, the Internet Protocol address of the member routers 18 already in the VPN, and the VPN identifier. The message generator 24 responsively generates a notify message for the member routers 18, and a join message for the joining router 18. The notify message includes the Internet Protocol address of the joining router 18, the VPN identifier, and a command requesting that the router 18 receiving the message form a tunnel between it and the joining router 18. In a similar manner, the join message includes the Internet Protocol address of all member routers 18 (i.e., at least one), the VPN identifier, and a command requesting that the joining router 18 form a tunnel between it an all other member routers 18 identified in the message.

Once the messages are generated, they are forwarded to the output 30 and consequently, transmitted to the appropriate devices via the Internet 16 (step 412), thus ending the process. Accordingly, a copy of the notify message is transmitted to all routers 18 that are existing members of the VPN, while the join message is transmitted to the joining router 18.

Upon receipt, a receiving router 18 parses the notify message to ascertain the VPN identifier and Internet Protocol address of the joining router 18. In response, the receiving router 18 contacts the joining router 18 via a conventional router protocol to form a communication tunnel. Among others, such protocols may include the Routing Information Protocol ("RIP"), the Border Gateway Protocol ("BGP"), and the Open Shortest Path First ("OSPF"). In a similar manner, the joining router 18 parses the received join message to ascertain the VPN identifier and the Internet Protocol address of each router 18 in the VPN. The joining router 18 then also contacts the other routers 18 via a conventional router protocol to form the communication tunnel in accord with conventional processes. In illustrative embodiments, these tunnels do not necessarily include the manager server 14 and thus, are relatively direct tunnels between routers 18. In illustrative embodiments, a tunnel includes the manager server 14 only if it is the most efficient tunnel.

While forming the tunnels in a VPN, cooperating routers 18 may utilize various security protocols to ensure that data in the VPN is not comprised during data transmission. One such protocol is the Internet Protocol security protocol ("IPsec"), which is well known IETF (Internet Engineering Task Force) standard defining certain requirements for establishing a secure electronic channel with a session key. One known security method that is used by the IPsec protocol that may be utilized in illustrative embodiments is known as the "Rivest, Shamir, and Adleman cryptography method" (RSA cryptography method).

VPNs may be formed in any desired topology. To that end, the initial router 18 that forms a VPN may include data relating to topology in the initial request to the manager server 14. The manager server 14 consequently may store such information in the database 22a, and include such information to subsequent notify and join messages. In illustrative embodiments, any well known topology may be used, such as full mesh topology, ring topology, star topology, or any combination thereof. For example, an initial router 18 of a given VPN may designate itself as a central router 18 in a star topology. Accordingly, the database 22a in such example includes topology data indicating that the given VPN utilizes a star topology, and that the initial router 18 is the central router 18. Such data therefore is included in all subsequent join and notify messages.

Figure 5:
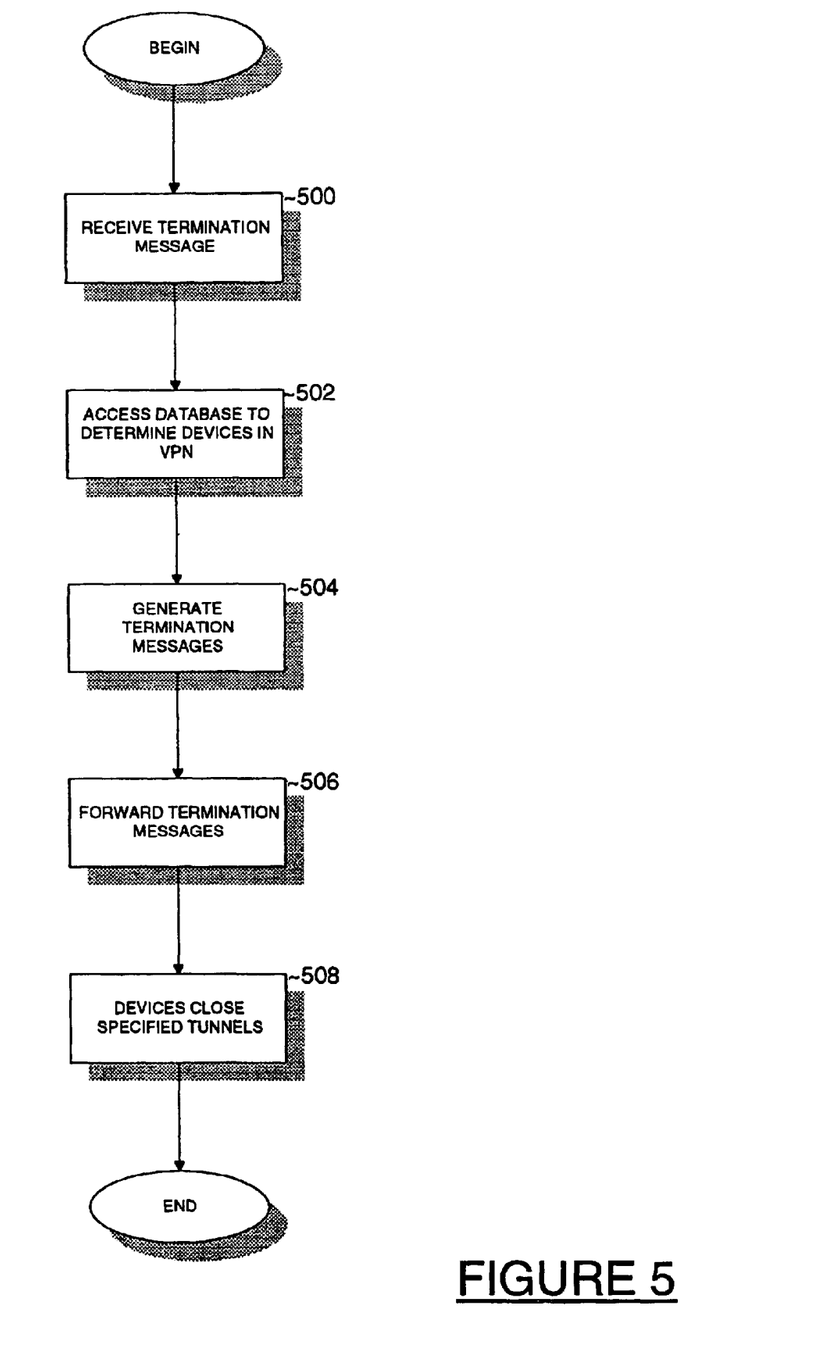
FIG. 5 shows an illustrative process utilized by the manager server in FIG. 2 for removing a router from a VPN.

FIG. 5 shows an illustrative process utilized by the manager server 14 for removing a router 18 from a given VPN. The process begins at step 500 in which a termination message is received at the input port 28. The termination message is generated and forwarded to the manager server 14 from a router 18 requesting that it be removed from the given VPN. In illustrative embodiments, the termination message includes the Internet Protocol address of the router 18 requesting to be terminated (terminated router 18T), the VPN identifier of the given VPN, and data indicating that the terminated router 18T is to be terminated.

Upon receipt of the termination message, the VPN logic 26 accesses the database 22a to determine which routes 18 (if any) are members of the VPN at that time (step 502). The process continues to step 504 in which the Internet Protocol addresses of all members of the given VPN are retrieved from the database 22a, and then added to a newly generated first termination message. In addition to the Internet Protocol addresses, the first termination message also includes the VPN identifier of the given VPN. The message generator 24 also responsively generates a second termination message that includes the Internet Protocol address of the terminated router 18T, and the VPN identifier of the given VPN.

Once the first and second termination messages are generated, they are forwarded to the output port 30 for transmission to the respective routers 18 (step 506). In particular, the first termination message is transmitted to the terminated router 18T, and the second termination message is forwarded to each of the routers 18 that are members of the given VPN at that time. After the messages are transmitted, the Internet Protocol address of the terminated router 18T is removed from the database 22a for the given VPN.

Upon receipt of the first termination message, the terminated router 18T communicates with each router 18 identified in the message to disconnect any communication tunnels established for the given VPN between it and such other router(s) 18 (step 508). In a similar manner, upon receipt of the second termination message, a receiving router 18 communicates with the terminated router 18T to disconnect any communication tunnels established for the given VPN between it and the terminated router 18T. Conventional tunnel termination methods may be utilized to terminate inter-router tunnels.

As known in the art, routers 18 in a VPN can malfunction and thus, lose all communication tunnels with other routers 18 in its VPN. Moreover, a router 18 can be removed from its VPN without the interaction described above with reference to FIG. 5 and similarly stop communicating with other routers 18 in the VPN. When a router 18 is no longer communicating in one of these manners, however, the manager server 14 is not notified and thus, maintains such router's Internet Protocol address in its database 22a. This can cause problems when subsequent routers 18 attempt to contact the router 18 that is causing the problem.

This problem may be solved, however, by including a polling mechanism on each router 18 and/or the manager server 14. Specifically, the polling mechanism on each router 18 may transmit a status message to the manager server 14 once during each preselected time interval. This interval may be configured to be any time frame, such as every tenth of a second, every several hours, or any other periodic interval. Upon receipt of a status message from a given router 18, the manager server 14 may generate and transmit an acknowledgment of receipt of the status message. Accordingly, the manager server 14 has a poll timer that is set to count down during each given time interval. If a status message is not received from any of the routers 18

(i.e., a "non-responsive router 18") in the given VPN during one given time interval, then the Internet Protocol address of the non-responsive router 18 is deleted from the database 22a in the manager server 14. The manager server 14 then generates and transmits a second message (described above with reference to FIG. 5) to each of the routers 18 in the VPN, causing them to terminate communication with the non-responsive router 18.

Alternatively, instead of a polling mechanism between the manager server 14 and the routers 18, each router 18 merely can forward a message to the manager server 14 each time such router 18 detects that one of the routers 18 in its VPN is not responsive. The message includes the VPN identifier and the Internet Protocol address of the non-responsive router 18. Upon receipt of the message, the manager server 14 then can attempt to contact the non-responsive router 18 to confirm that it, in fact, is not responding. If confirmed, then its Internet Protocol address is deleted from the database 22a. The manager server 14 then generates and transmits a second message (described above) to each of the routers 18 in the VPN, causing them to terminate communication with the non-responsive router 18.

Illustrative embodiments of the invention may be implemented in any conventional computer programming language. For example, illustrative embodiments may be implemented in a procedural programming language (e.g., "C") or an object oriented programming language (e.g., "C++" or "JAVA"). Alternative embodiments of the invention may be implemented as preprogrammed hardware elements (e.g., application specific integrated circuits or digital signal processors), or other related components.

Alternative embodiments of the invention also may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet 16 or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A method of managing a virtual private network, the method comprising:

receiving a request for a given network device to join a given virtual private network having a set of network devices, the request being received from the given network device, the request having a given network device identifier that identifies the given network device;

retrieving, from a network device memory set, a set of network device identifiers that identify all network devices in the set of network devices;

forwarding a notify message to each network device in the set of network devices, the notify message including the given network device identifier;

forwarding a join message to the given network device, the join message including the set of network device identifiers;

establishing an encrypted communication tunnel between the given network device and at least one of the set of network devices; and storing, in the network device memory set, the given network device identifier.

2. The method as defined by claim 1 wherein establishing the encrypted communication tunnel further comprises, in response to receipt of the notify message, at least one of the set of network devices communicating with the given network device to establish the communication tunnel with the given network device.

3. The method as defined by claim 1 wherein establishing the encrypted communication tunnel further comprises, in response to receipt of the join message, the given network device communicating with at least one of the network devices in the set of network devices to establish the communication tunnel with the at least one of the set of network devices.

4. The method as defined by claim 1 wherein the request includes a network identifier identifying the given virtual private network.

5. The method as defined by claim 1 wherein the total number of network devices in the set of network devices equals zero, the network device memory set being a database that is established for the given virtual private network in response to receipt of the request.

6. The method as defined by claim 1 wherein the request is received from a packet based network.

7. The method as defined by claim 1 further comprising:

authenticating the request to confirm the identify of the given network device.

8. The method as defined by claim 1 wherein each network identifier is an Internet Protocol address.

9. The method as defined by claim 1 further comprising:

receiving a remove message from a remove network device;

retrieving all network device identifiers from the network device memory set; and forwarding a first message to all network devices identified by retrieved network device identifiers, each first message including a remove identifier identifying the remove network device.

10. The method as defined by claim 9 wherein the response to receipt of the first message, at least one of the network devices in the set of network devices disconnects a communication tunnel between the at least one network device and the remove network device.

11. The method as defined by claim 9 further comprising:
forwarding a second message to the remove network device, the second message including the retrieved network device identifiers.

12. The method as defined by claim 1 wherein the join message and notify message include data identifying the given virtual private network.

13. The method as defined by claim 1 further comprising: generating the notify message and the join message.

14. An apparatus for managing a virtual private network, the apparatus comprising:
an input that receives a request for a given network device to join a given virtual private network having a set of network devices, the request being received from the given network device, the request having a given network device identifier that identifies the given network device;
data storage for storing a set of network device identifiers that identify all network devices in the set of network devices;
a message generator that generates a notify message and a join message, the notify message including the given network device identifier, the join message including the set of network device identifiers;
a request parser that parses the request to determine the given network device identifier for storage in the data storage;
a tunnel establishment component that establishes an encrypted communication tunnel between the given network device and at least one of the set of network devices; and
an output that forwards one copy of the notify message to each network device in the set of network devices, the output also forwarding the join message to the given network device.

15. The apparatus as defined by claim 14 wherein in response to receipt of the notify message, at least one of the set of network devices communicates with the given network device to establish the communication tunnel with the given network device.

16. The apparatus as defined by claim 14 wherein the response to receipt of the join message, the given network device communicates with at least one of the network devices in the set of network devices to establish the communication tunnel with the at least one of the set of network devices.

17. The apparatus as defined by claim 14 wherein the request includes a network identifier identifying the given virtual private network.

18. The apparatus as defined by claim 14 wherein the total number of network devices in the set of network devices equals zero, the data storage including a database that is generated for the given virtual private network in response to receipt of the request.

19. The apparatus as defined by claim 14 wherein the request is received from a packet based network.

20. The apparatus as defined by claim 14 further comprising:
an authentication module operatively coupled with the input, the authentication module authenticating the request to confirm the identity of the given network device.

21. The apparatus as defined by claim 14 wherein each network identifier is an Internet Protocol address.

22. The apparatus as defined by claim 14 wherein the input receives a remove message from a remove network device, the remove network device being one of the set of network devices, the apparatus further comprising:
retrieval logic that retrieves all network device identifiers from the network device memory set; and
a removal message generator operatively coupled with the retrieval logic, the removal message generator generating a first message having a remove identifier identifying the remove network device, the output forwarding the first message to all network devices identified by retrieved network device identifiers.

23. The apparatus as defined by claim 22 wherein in response to receipt of the first message, at least one of the network devices in the set of network devices disconnects a communication tunnel between the at least one network device and the remove network device.

24. The method as defined by claim 22 wherein the remove message generator generates a second remove message that is forwarded to the remove network device, the second remove message including the retrieved network device identifiers.

25. The method as defined by claim 14 wherein the join message and notify message include data identifying the given virtual private network.

26. A computer program product for use on a computer system for managing a virtual private network, the computer program product comprising a computer usable medium having computer readable program code thereon, a computer readable program code including:
program code for receiving a request for a given network device to join a given virtual private network having a set of network devices, the request being received from the given network device, the request having a given network device identifier that identifies the given network device;
program code for retrieving, from a network device memory set, a set of network device identifiers that identify all network devices in the set of network devices;
program code for retrieving, from a network device memory set, a set of network device identifiers that identify all network devices in the set of network devices;
program code for forwarding a notify message to each network device in the set of network devices, the notify message including the given network device identifier;
program code for forwarding a join message to the given network device, the join message including the set of network device identifiers;
program code for establishing an encrypted communication tunnel between the given network device and at least one of the set of network devices; and
program code for storing, in the network device memory set, the given network device identifier.

27. The computer program product as defined by claim 26 wherein in response to receipt of the notify message, at least one of the set of network devices communicates with the given network device to establish the communication tunnel with the given network device.

28. The computer program product as defined by claim 26 wherein in response to receipt of the join message, the given network device communicates with at least one of the network devices in the set of network devices to establish the communication tunnel with the at least one of the set of network devices.

29. The computer program product as defined by claim 26 wherein the request includes a network identifier identifying the given virtual private network.

30. The computer program product as defined by claim 26 wherein the total number of network devices in the set of network devices equals zero, the network device memory set being a database that is established for the given virtual private network in response to receipt of the request.

31. The computer program product as defined by claim 26 wherein the request is received from a packet based network.

32. The computer program product as defined by claim 26 further comprising:

program code for authenticating the request to confirm the identity of the given network device.

33. The computer program product as defined by claim 26 wherein each network identifier is an Internet Protocol address.

34. The computer program product as defined by claim 26 further comprising:

program code for receiving a remove message from a remove network device;

program code for retrieving all network device identifiers from the network device memory set;

program code for generating a first message having a remove identifier identifying a remove network device; and program code for forwarding the first message to all network devices identified by retrieved network device identifiers.

35. The computer program product as defined in claim 34 wherein in response to receipt of the first message, at least one of the network devices in the set of network devices disconnects a communication tunnel between at least one network device and remove network device.

36. The computer program produce as defined by claim 34 further comprising:

program code for generating a second message having the retrieved network device identifiers; and program code for forwarding the second message to the remove network device.

37. The computer program as defined by claim 26 wherein the join message and notify message include data identifying the given virtual private network.

38. The computer program product as defined by claim 26 further comprising:

program code for generating the notify message; and program code for generating the join message.

39. A method of managing a virtual private network having a set of member network devices, each member network device being identified by a device identifier, the method comprising:

maintaining a storage device having the device identifier of each member of the set of network devices, the storage device being updated as network devices are added to and removed from the virtual private network;

receiving a request for a given network device to join the virtual private network, the request being received from the given network device, the request having a given network device identifier that identifies the given network device and data identifying the virtual private network;

generating a notify message having the given network device identifier;

generating a join message having the device identifiers in the storage device;

forwarding the notify message to each of the set of network device;

establishing an encrypted communication tunnel between the given network device and at least one of the set of network devices; and forwarding the join message to the given network device.

40. The method as defined in claim 39 wherein in response to receipt of the notify message, at least one of the set of network devices communicates with the given network device to establish the communication tunnel with the given network device.

41. The method as defined by claim 39 wherein in response to receipt of the join message, the given network device communicates with at least one of the member network devices to establish the communication tunnel with the at least one member network device.

42. The method as defined by claim 39 further comprising:

authenticating the request to confirm the identity of the given network device.

43. The method as defined by claim 39 further comprising:

receiving a remove message from a remove network device;

retrieving all device identifiers from the storage device; and forwarding a first message to all network devices identified by retrieved device identifiers, each first message including a remove identifier identifying the remove network device.

44. The method as defined by claim 43 wherein in response to receipt of the first message, at least one of the member network devices disconnects a communication tunnel between the at least one member network device and the remove network device.

45. The method as defined by claim 43 further comprising:

forwarding a second message to the remove network device, the second message including the retrieved device identifiers.

46. A computer program product for use on a computer system for managing a virtual private network having a set of member network devices, each member network device being identified by a device identifier, the computer program product comprising a computer usable medium having computer readable program code thereon, the computer readable program code including:

program code for maintaining a storage device having the device identifier of each member of the set of network devices, the storage device being updated as network devices are added to and removed from the virtual private network;

program code for receiving a request for a given network device to join the virtual private network, the request being received from the given network device, the request having a given network device identifier that identifies the given network device and data identifying the virtual private network;

program code for forwarding the notify message to each of the set of network devices;

program code for establishing an encrypted communication tunnel between the given network device and at least one of the set of network devices; and program code for forwarding the join message to the given network device.

47. The computer program product as defined by claim 46 wherein in response to receipt of the notify message, at least one of the set of network devices communicates with the given network device to establish the communication tunnel with the given network device.

48. The computer program product as defined by claim 46 wherein in response to receipt of the join message, the given network device communicates with at least one of the member network devices to establish the communication tunnel with the at least one member network device.

49. The computer program as defined by claim 46 further comprising:

program code for authenticating the request to confirm the identity of the given network device.

50. The computer program product as defined by claim 46 further comprising:

program code for receiving a remove message from a remove network device;

program code for retrieving all device identifiers from the storage device; and program code for forwarding a first message to all network devices identified by retrieved device identifiers, each first message including a remove identifier identifying the remove network device.

51. The computer program product as defined by claim 50 wherein in response to receipt of the first message, at least one of the member network devices disconnects a communication tunnel between the at least one member network device and the remove network device.

52. The computer program product as defined by claim 50 further comprising:

program code for forwarding a second message to the remove network device, the second message including the retrieved device identifiers.

53. A method of managing a virtual private network, the method comprising:

a given network device transmitting a request for the given network device to join the virtual private network having a set of network devices, the request having a given network device identifier that identifies the given network device;

retrieving, from a network device memory set, a set of network device identifiers that identify all network devices in the set of network devices;

forwarding a notify message to each network device in the set of network devices, the notify message including the given network device identifier;

forwarding a join message to the given network device, the join message including the set of network device identifiers;

establishing an encrypted communication tunnel between the given network device and at least one of the set of network devices; and storing, in the network device memory set, the given network device identifier.

54. The method as defined by claim 53 further comprising:

receiving the notify message;

retrieving the given network device identifier from the received notify message; and establishing the communication tunnel to the given network device after the given network device identifier is retrieved.

\* \* \* \* \*